Oct. 11, 1960    P. DANIELSSON    2,955,316
FISH DRESSING MACHINE
Filed Sept. 12, 1958

Inventor
Paul Danielsson
by Sommers & Young
Attorneys

United States Patent Office 2,955,316
Patented Oct. 11, 1960

2,955,316

FISH DRESSING MACHINE

Paul Danielsson, Stockholm, Sweden, assignor to Arenco Aktiebolag, Stockholm, Sweden, a Swedish joint-stock company Filed Sept. 12, 1958, Ser. No. 760,684

Claims priority, application Sweden Oct. 3, 1957

2 Claims. (Cl. 17—4)

The present invention relates to a fish dressing machine having a pair of flexible, endless conveying belts forming the side walls of a conveying channel in which fishes are longitudinally fed between a pair of clamping members, resiliently urging the belts towards each other, towards and past a cutting device. The invention relates particularly to a machine capable of opening the belly of each fish independently of the size of the individual fishes passing through the machine by cutting out a strip which is large enough to have the fish effectively opened without losing valuable parts of the fish. Accordingly the conveying belts adjacent said clamping members are yieldingly arranged parallel with the center plane of the conveying channel and in a direction away from the cutting device. A guide rail or the like is positioned in said center plane obliquely directed into the conveying channel and adapted to be moved through a motion transferring device by the clamping members in such a manner that the free end of it, positioned in said center plane and directed in the conveying direction, when the clamping members are brought towards each other moves towards a position adjacent a cutting edge of the cutting device for cutting out a strip of the belly of the fish.

Figure 1:
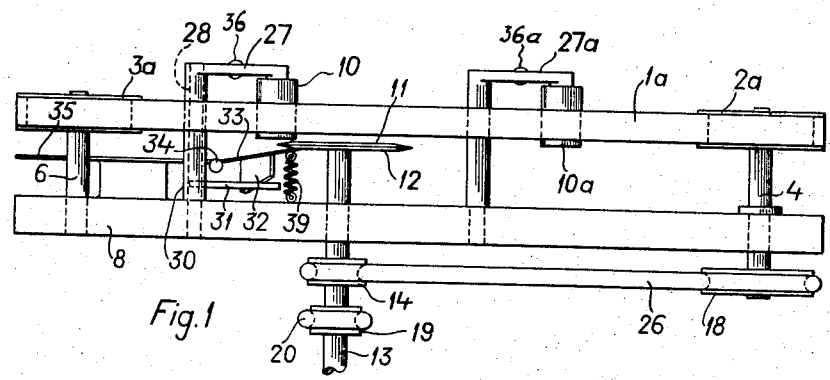
Figure 2:
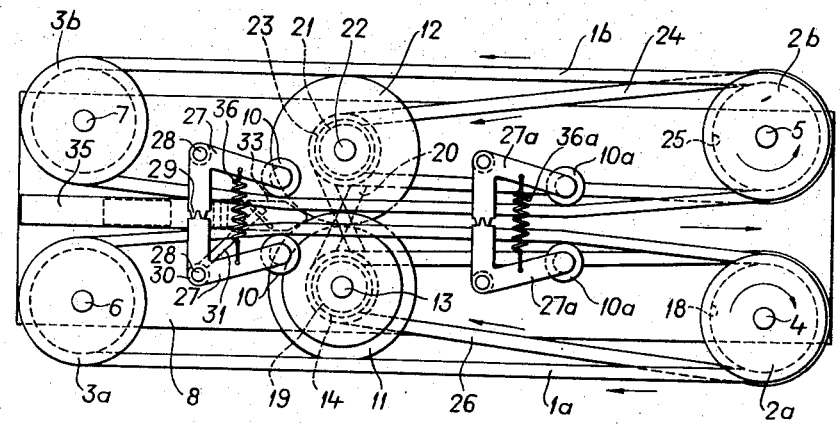

In the drawing Figure 1 is a side view and Figure 2 a plan view of an embodiment of the invention.

In the embodiment shown the machine according to the invention is provided with a belly-strip cutting device and a conveyor, adapted to transport fish towards and past the belly cutting device. The conveyor consists of a pair of flexible, endless and slightly elastic belts 1a, 1b, each running in circumferential grooves in a pair of wheels 2a, 2b and 3a, 3b, respectively. The wheels 2a, 2b are secured to shafts 4 and 5, respectively, rotatably journalled in a support plate 8 and the wheels 3a, 3b are freely mounted on shafts 6 and 7, respectively, secured to said support plate. The belly cutting device in the embodiment shown comprises a pair of horizontally arranged, circular knives 11, 12 with overlapping edges. The knife 11 is secured to a vertical driving shaft 13, rotatably journalled in the support plate 8 constituting the base or frame of the machine, said shaft 13 having a sheave 14 driving a sheave 18 secured to the shaft 4 through a rope 26. The driving shaft 13 has secured thereto a further sheave 19, driving through a crossed rope 20 a sheave 21 of the same size as the sheave 19 and secured to a shaft 22 freely rotatably journalled in the support plate 8.

To the shaft 22 is secured a further sheave 23 of the same size as the sheave 14, which sheave 23 is driving a sheave 25, secured to the shaft 5, through a rope 24; both the belts 1a, 1b thus running at the same speed in the directions indicated in Figure 2.

Adjacent the knives 11, 12 at the feeding end the conveyor belts 1a, 1b are guided by guide members in the form of smooth rollers 10, resting against the inner surface of said belts and each freely rotatably journalled in a bell crank 27. The bell cranks 27 are each freely rockably journalled on one of bars 28 which engage each other by means of teeth 29 so that the two guide rollers 10 are moved transversely simultaneously to the same extent.

Secured to the hub 30 of one bell crank 27 is an arm 31 resting against an inclined guide surface of a guide member 32. The guide member 32 is secured to the under side of a guide bar 33. The guide bar 33 is positioned in the center plane of the conveying channel, formed of the belts 1a, 1b and its foremost, narrowing end extends in an up-turned position, shown in Figure 1 approximately to a point where the edges of the two knives 11, 12, Figure 2, intersect each other, that is, to a point close to the cutting edge of the cutting device. Thus, the guide bar 33 is upwardly directed, Figure 1, towards the point of intersection of the cutting edges, that is, obliquely directed into the conveying channel between the belts 1a, 1b. The guide bar 33 is so positioned owing to the fact that its rear end is pivotally connected by means of a hinge 34 to a feeding plate 35 secured to the support plate 8. The guide bar 33 is urged by a tension spring 39 against the arm 31 through the intermediary of guide member 32 which arm 31 in the position shown in Figure 2 rests against the lowermost part of the guide member 32. This is the case when a tension spring 36 connecting the bell cranks 27 has brought the rollers 10 towards each other to such an extent that they hold the inner parts of the belts 1a, 1b comparatively close to each other (Figure 2). Further on in the feeding direction said two parts of the belts are held comparatively close to each other by a pair of rollers 10a, journalled in bell cranks 27a connected to each other by means of a tension spring 26a. The assembly comprising the members 10a, 27a and 36a is identical with the assembly comprising the members 10, 27 and 36, with the exception that there are no corresponding arm 31 and guide member 32. The arrangement of the clamping rollers 10, 10a provides a fish feeding channel, consisting of the belts 1a, 1b, having a converging feed end and a diverging outlet end.

When the mechanism described is in operation a fish, belly downwards and the decapitated head end leading towards the knives 4, is introduced between the belts 1a, 1b and put on the plate 35. As the fish is fed forwards by the belts 1a, 1b between the rollers 10, 10a, said rollers move outwardly in accordance with the thickness of the fish. When guide rollers 10 are brought away from each other the arm 31 is rocked clockwise (Figure 2) allowing the guide bar 33 to be rocked downwards by the spring 39 so that a strip of the belly is cut out when the belly engages the cutting edges of the knives 11, 12 at a distance above the foremost end of the guide bar 33 which distance is determined by the thickness of the fish. The fish itself does not depress the guide bar 33. If the fish during its sliding movement upwards on the guide bar 33 tends to depress said bar the fish instead lifts those parts of the belts 1a, 1b which are guided by the rollers.

As the fish, thicker end in feeding direction, is fed between the clamping rollers 10 said rollers carry the belts 1a, 1b towards each other around the narrowing, rear part of the body of the fish. As the rollers 10 move towards each other the guide bar 33 is rocked upwards, so that its fore end approaches the converging edges of the knives 11, 12 at the cutting point thus the strip cut out being successively narrower. Finally the rollers 10 have been brought so close to each other that the fore parts of the guide bar 33 according to Figure 1 is positioned approximately on a level with the cutting edges wherefore no strip is cut out from the tail part of the body of the fish.

I claim:
1. In a fish dressing machine, in combination a machine frame two endless flexible conveyor belts operably mounted in said frame and having forwardly advancing adjacent flights arranged in parallel spaced relation forming at least part of a fish conveying channel therebetween for receiving and advancing fish to be dressed positioned on their bellies, fish gaging means including a pair of belt guiding members located respectively at either side of said conveying channel, and engaging and yieldingly supporting said belts respectively and yieldingly allowing movement of the positions of said belt guiding members transversely to the fish feeding direction in dependence on the thickness of the advancing fish passing said yielding belt guiding and supporting members, cutting means mounted fixedly in a position below said conveying channel to cut out a strip from the belly of the advancing fish passing said belt guiding members of said gaging means, a fixed elongated fish supporting member extending parallel with and beneath a portion of said channel in position to be engaged by the belly of the advancing fish, a fish supporting guide bar having its rear end portion pivotally mounted relative to said fixed fish supporting member and its opposite end directed in the direction of movement of the fish toward said cutting means, an adjustable control means operably connected with said pivoted guide bar, means operably interconnecting said fish gaging means and said control means to adjust the latter in dependence on the position of said belt guiding members of said fish gaging means as determined by the thickness of the fish being gaged so as to swing said guide bar about its pivot downwardly the more the greater the thickness of the advancing fish and upwardly depending on the lesser thickness of the advancing fish, whereby the depth of the cut and, thus, the thickness of the strip cut from the belly of the respective fish to open same varies with the thickness of the fish as determined by said gaging means.

2. In a fish dressing machine, in combination, a machine frame, two endless flexible conveyor belts operably mounted in said frame and having forwardly advancing adjacent flights arranged in parallel spaced relation forming at least part of a fish conveying channel therebetween for receiving and advancing fish to be dressed positioned on their bellies, fish gaging means including a pair of belt guiding members located at either side of said belts respectively, and engaging and yieldingly supporting said belts respectively, and yieldingly allowing movement of the positions of said belt guiding members transversely to the fish feeding direction in dependence on the thickness of the advancing fish passing said yielding belt guiding and supporting members, cutting means mounted fixedly in a position below said conveying channel to cut out a strip from the belly of the advancing fish passing said belt guiding members of said gaging means, an elongated fish supporting guide bar extending in a vertical plane parallel with and located beneath a portion of said conveying channel formed by said belts in position to be engaged by the belly of the advancing fish, and said elongated fish supporting guide bar having its rear end portion pivoted to a pivotal axis mounted on said frame and its opposite end directed in the direction of movement of the fish toward said cutting means, an adjustable control means operably connected with said pivoted guide bar, means operably interconnecting said fish gaging means and said control means to adjust the latter in dependence on the position of said belt guiding members of said fish gaging means as determined by the thickness of the fish being gaged so as to swing said guide bar about its pivot downwardly the more the greater the thickness of the advancing fish and upwardly depending on the lesser thickness of the advancing fish, whereby the depth of the cut, and thus, the thickness of the strip cut from the belly of the respective fish to open same varies with the thickness of the fish as determined by said gaging means.

References Cited in the file of this patent
FOREIGN PATENTS

| | | |
|---|---|---|
| 156,511 | Australia | May 17, 1954 |
| 1,156,928 | France | Dec. 23, 1957 |